(12) United States Patent
Park et al.

(10) Patent No.: US 11,076,221 B2
(45) Date of Patent: Jul. 27, 2021

(54) ELECTRONIC DEVICE INCLUDING ACOUSTIC MODULE

(71) Applicant: Samsung Electronics Co., Ltd., Suwon-si (KR)

(72) Inventors: Seonguk Park, Suwon-si (KR); Kyungmoon Kang, Suwon-si (KR); Juhwan Kim, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/662,811

(22) Filed: Oct. 24, 2019

(65) Prior Publication Data
US 2020/0196046 A1  Jun. 18, 2020

(30) Foreign Application Priority Data
Dec. 12, 2018 (KR) .................. 10-2018-0159792

(51) Int. Cl.
*H04R 1/28* (2006.01)
*H04M 1/02* (2006.01)

(52) U.S. Cl.
CPC .......... *H04R 1/2803* (2013.01); *H04M 1/026* (2013.01); *H04R 2201/028* (2013.01); *H04R 2499/11* (2013.01)

(58) Field of Classification Search
CPC ...................................................... G06F 1/16
See application file for complete search history.

(56) References Cited

U.S. PATENT DOCUMENTS 10,356,498 B2   7/2019  Yoon et al.
2015/0163572 A1 6/2015  Weiss et al.
(Continued)

FOREIGN PATENT DOCUMENTS

JP   2009-005043 A   1/2009
KR   10-0688794 B1   3/2007
(Continued)

OTHER PUBLICATIONS

International Search Report dated Jan. 17, 2020; International Appln. No. PCT/KR2019/013167.

*Primary Examiner* — Jerry Wu
(74) *Attorney, Agent, or Firm* — Jefferson IP Law, LLP

(57) ABSTRACT

An electronic device is provided. The electronic device includes a housing including a front plate, a rear plate, and a lateral member surrounding a space between the front and rear plates and having at least one through-hole. The electronic device further includes a display disposed to be seen through the front plate, and a speaker structure disposed near the through-hole in the space between the display and the rear plate. The speaker structure includes a yoke disposed between the display and the rear plate and facing the display, a diaphragm disposed between the rear plate and the yoke and spaced apart from the rear plate, a magnet disposed between the yoke and the diaphragm, a speaker housing surrounding, at least in part, at least one of the diaphragm, the yoke, or the magnet and including a first opening formed toward the rear plate and a second opening formed toward the through-hole. The electronic device further includes a sealing member disposed between the speaker housing and the rear plate and surrounding the first opening when viewed from the rear plate. A sound conduit includes, between the diaphragm and the through-hole, a first space formed by the first opening, the rear plate, and the sealing member, and a (Continued)

second space connected to the first space through the second opening.

9 Claims, 12 Drawing Sheets

(56) References Cited

U.S. PATENT DOCUMENTS

| | | | |
|---|---|---|---|
| 2016/0037243 A1* | 2/2016 | Lippert | H04R 1/086 |
| | | | 381/166 |
| 2016/0112781 A1 | 4/2016 | Lee et al. | |
| 2016/0212526 A1* | 7/2016 | Salvatti | H04R 1/026 |
| 2018/0206354 A1 | 7/2018 | Yoon et al. | |

FOREIGN PATENT DOCUMENTS

| | | |
|---|---|---|
| KR | 10-2016-0044352 A | 4/2016 |
| KR | 10-2017-0098009 A | 8/2017 |
| KR | 10-2018-0085506 A | 7/2018 |

* cited by examiner

ELECTRONIC DEVICE INCLUDING ACOUSTIC MODULE

CROSS-REFERENCE TO RELATED APPLICATION(S)

This application is based on and claims priority under 35 U.S.C. § 119(a) of a Korean patent application number 10-2018-0159792, filed on Dec. 12, 2018, in the Korean Intellectual Property Office, the disclosures of which is incorporated by reference herein in its entirety.

BACKGROUND

1. Field

The disclosure relates to an electronic device including an acoustic module.

2. Description of Related Art

One of current trends in developing electronic devices to meet customer's demands is slimming a device body, that is, reducing a thickness of the electronic device. In addition, such electronic devices are being developed to increase their stiffness, strengthen their design aspects, and differentiate their functional features.

Various electronic components equipped in an internal space of the electronic device need to be efficiently disposed even in the reduced internal space according to the slimming trend. In addition, such spatial arrangement of the electronic components should not affect the reliability, functions, qualities, and performance of the electronic device.

Ideally, a plurality of electronic components of the electronic device should be arranged at suitable positions in the internal space and also properly perform their functions. Such electronic components may include a printed circuit board (PCB), a display, various electronic elements, various sensors, and/or at least one acoustic module. In particular, the acoustic module may include at least one microphone that collects external sounds, and at least one speaker that transmits sounds generated from the electronic device to the outside.

Such an acoustic module may have at least one magnet supported by a yoke, and a diaphragm disposed near the magnet and including a coil member for inducing a sound generation through a vibration. These components of the acoustic module may be disposed within a separate acoustic module housing, and this acoustic module housing may be appropriately disposed to be at least partially exposed to an external environment in an internal space of a housing of the electronic device.

Particularly, in order to assure the maximum vibration width of the diaphragm, the speaker should be arranged to maintain the minimum distance between the diaphragm and the speaker housing. This distance may be an important factor in determining the size and/or thickness of the electronic device. For example, when the minimum distance between the diaphragm and the speaker housing is reduced for slimming down the electronic device, the diaphragm may produce a relatively large vibration in a low frequency band. Unfortunately, this may cause the degradation of sound quality due to the interference of the speaker housing.

In addition, the speaker housing needs to be in contact with a certain structure inside the housing of the electronic device formed in a specific shape due to design constraints. Thus, in this situation, the thickness of the speaker housing may be an obstacle to the slimming trend of the electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including an acoustic module.

Another aspect of the disclosure is to provide an electronic device including an acoustic module configured to improve a sound quality without causing an increase in volume of the electronic device.

Another aspect of the disclosure is to provide an electronic device including an acoustic module that is helpful to slimming down the electronic device while preventing a sound quality from being degraded.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front plate facing in a first direction, a rear plate facing in a second direction opposite to the first direction, and a lateral member surrounding a space between the front and rear plates, and the lateral member having at least one through-hole, a display disposed to be seen through the front plate, and a speaker structure disposed near the through-hole in the space between the display and the rear plate. The speaker structure may include a yoke disposed between the display and the rear plate and facing the display, a diaphragm disposed between the rear plate and the yoke and spaced apart from the rear plate, a magnet disposed between the yoke and the diaphragm, a speaker housing surrounding, at least in part, at least one of the diaphragm, the yoke, or the magnet, and the speaker housing including a first opening formed toward the rear plate and a second opening formed toward the through-hole, and a sealing member disposed between the speaker housing and the rear plate and surrounding the first opening when viewed from the rear plate. A sound conduit may include, between the diaphragm and the through-hole, a first space formed by the first opening, the rear plate, and the sealing member, and a second space connected to the first space through the second opening.

In accordance with another aspect of the disclosure, an electronic device is provided. The electronic device includes a housing including a front plate facing in a first direction, a rear plate facing in a second direction opposite to the first direction, and a lateral member surrounding a space between the front and rear plates, and the lateral member having at least one through-hole, a display disposed to be seen through the front plate, an intermediate plate disposed between the display and the rear plate, and a speaker structure disposed near the through-hole in the space between the intermediate plate and the rear plate. The speaker structure may include a yoke disposed between the intermediate plate and the rear plate and facing the rear plate, a diaphragm disposed between the intermediate plate and the yoke and spaced apart from the intermediate plate, a magnet disposed between the yoke and the diaphragm, a speaker housing surrounding, at least in part, at least one of the diaphragm, the yoke, or the magnet, and the speaker housing including a first opening formed toward the intermediate plate and a second opening formed toward the through-hole, and a sealing member disposed between the speaker housing and the intermediate plate and surrounding the first opening when viewed from the intermediate plate. A sound conduit may include, between the diaphragm and the through-hole, a first space formed by the first opening, the intermediate plate, and the sealing member, and a second space connected to the first space through the second opening.

In accordance with another aspect of the disclosure, an electronic device is provided. The electronic device includes a housing including a front plate facing in a first direction, a rear plate facing in a second direction opposite to the first direction, and a lateral member surrounding a space between the front and rear plates, and the lateral member having at least one through-hole, at least one structure disposed between the front plate and the rear plate, an acoustic module disposed near the through-hole in the space between the structure and the rear plate, and a sealing member. The acoustic module may include an acoustic module housing disposed in the space and including a first opening formed toward the structure and a second opening formed toward the through-hole in communication with the first opening, a diaphragm disposed to be exposed, at least in part, toward the structure through the first opening in the acoustic module housing, at least one magnet disposed near the diaphragm, and at least one yoke disposed to be at least partially in contact with the at least one magnet. The sealing member may be disposed between the acoustic module housing and the structure along a rim of the first opening. A sound conduit may include a first space formed by the first opening, the structure, and the sealing member, and a second space connected to the first space through the second opening.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
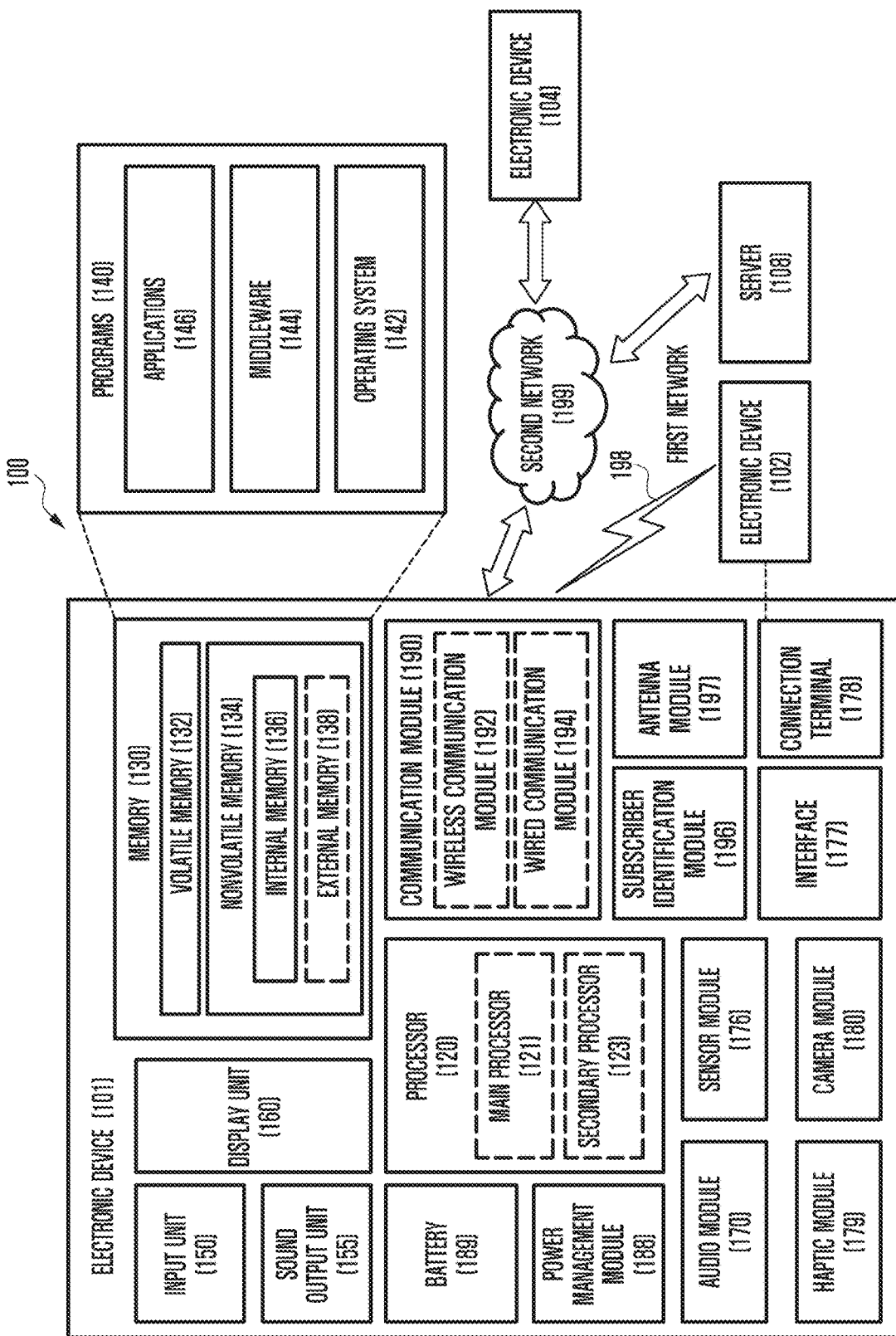
FIG. 1 is a block diagram illustrating an electronic device in a network environment according to an embodiment of the disclosure.

FIG. 1 is a block diagram of an electronic device in a network environment according to an embodiment of the disclosure.

Referring to FIG. 1, in a network environment 100, an electronic device 101 may communicate with a first external electronic device 102 through a first network 198 (e.g., short-range wireless communication network) or may communicate with a second external electronic device 104 or a server 108 through a second network 199 (e.g., long-distance wireless communication network). In one embodiment, the electronic device 101 may communicate with the second external electronic device 104 through the server 108. According to an embodiment, the electronic device 101 may include a processor 120, a memory 130, an input unit 150, a sound output unit 155, a display unit 160, an audio module 170, a sensor module 176, an interface 177, a haptic module 179, a camera module 180, a power management module 188, a battery 189, a communication module 190, a subscriber identification module 196, and an antenna module 197. In one embodiment, at least one component (e.g., the display unit 160 or the camera module 180) among the components of the electronic device 101 may be omitted, or other components may be added to the electronic device

101. In one embodiment, some of these components may be implemented as an integrated circuit. For example, the sensor module 176 (e.g., fingerprint sensor, iris sensor, or illuminance sensor) may be embedded in the display unit 160 (e.g., display).

The processor 120 may execute, for example, software (e.g., a program 140) to control at least one of other components (e.g., hardware component or software component) of the electronic device 101 connected to the processor 120, and may process a variety of data or perform various computations. In one embodiment, as part of data processing or computation, the processor 120 may load a command or data received from other components (e.g., the sensor module 176 or the communication module 190) into the volatile memory 132, process the command or data stored in the volatile memory 132, and store the result data in nonvolatile memory 134. In one embodiment, the processor 120 may include a main processor 121 (e.g., central processing unit, or application processor), and a secondary processor 123 (e.g., graphics processing unit, image signal processor, sensor hub processor, or communication processor), which may operate independently of or in cooperation with the main processor 121. Additionally or alternatively, the secondary processor 123 may consume less power or may be more specialized in a specific function compared with the main processor 121. The secondary processor 123 may be implemented separately from or as part of the main processor 121.

The secondary processor 123 may control at least some of the functions or states associated with at least one component (e.g., the display unit 160, the sensor module 176, or the communication module 190) among the components of the electronic device 101, for example, instead of the main processor 121 while the main processor 121 is in an inactive (e.g., sleep) state, or together with the main processor 121 while the main processor 121 is in an active (e.g., application execution) state. In one embodiment, the secondary processor 123 (e.g., image signal processor or communication processor) may be implemented as a part of another component (e.g., the camera module 180 or the communication module 190) that is functionally related to the secondary processor 123.

The memory 130 may store a variety of data used by at least one component (e.g., the processor 120 or the sensor module 176) of the electronic device 101. The data may include, for example, software (e.g., the program 140) and input data or output data for commands associated with the software. The memory 130 may include the volatile memory 132 or the nonvolatile memory 134.

The programs 140 may be stored in the memory 130 as software, and may include, for example, an operating system 142, a middleware 144, or an application 146.

The input unit 150 may receive a command or data, which can be to be used for a component (e.g., the processor 120) of the electronic device 101, from the outside of the electronic device 101 (e.g., user). The input unit 150 may include, for example, a microphone, a mouse, a keyboard, or a digital pen (e.g., stylus pen).

The sound output unit 155 may output a sound signal to the outside of the electronic device 101. The sound output unit 155 may include, for example, a speaker and a receiver. The speaker may be used for general purposes, such as playback of multimedia or recordings, and the receiver may be used for receiving an incoming call. In one embodiment, the receiver may be implemented separately from or as part of the speaker.

The display unit 160 may visually information to the outside of the electronic device 101 (e.g., user). The display unit 160 may include, for example, a display, a hologram device, or a projector, and a control circuit for controlling these. In one embodiment, the display unit 160 may include a touch circuitry configured to sense a touch, or a sensing circuitry (e.g., pressure sensor) configured to measure the strength of a force caused by a touch action.

The audio module 170 may convert a sound into an electric signal or convert an electric signal into a sound. In one embodiment, the audio module 170 may obtain a sound signal through the input unit 150 or may output a sound signal through an external electronic device (e.g., the first external electronic device 102 (e.g., speaker or headphone)) wiredly or wirelessly connected to the sound output unit 155 or the electronic device 101.

The sensor module 176 may generate an electrical signal or a data value corresponding to the operating state (e.g., power or temperature) of the electronic device 101 or the environmental state (e.g., user state) outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols that enable the electronic device 101 to directly or wirelessly connect to an external electronic device (e.g., the first external electronic device 102). In one embodiment, the interface 177 may include, for example, a high-definition multimedia interface (HDMI), a universal serial bus (USB) interface, a secure digital (SD) card interface, or an audio interface.

The connection terminal 178 may include a connector through which the electronic device 101 can be physically connected to an external electronic device (e.g., the first external electronic device 102). In one embodiment, the connection terminal 178 may include, for example, an HDMI connector, a USB connector, a secure digital (SD) card connector, or an audio connector (e.g., headphone connector).

The haptic module 179 may convert an electrical signal into a mechanical stimulus (e.g., vibration or motion) or an electrical stimulus that can be perceived by the user through tactile or kinesthetic senses. In one embodiment, the haptic module 179 may include, for example, a motor, a piezoelectric element, or an electric stimulator.

The camera module 180 may capture a still image or a moving image. In one embodiment, the camera module 180 may include at least one lens, an image sensor, an image signal processor, or a flash.

The power management module 188 may manage the power supplied to the electronic device 101. The power management module 188 may be implemented as part of a power management integrated circuit (PMIC).

The battery 189 may supply power to at least one component of the electronic device 101. In one embodiment, the battery 189 may include, for example, a non-rechargeable primary cell, a rechargeable secondary cell, or a fuel cell.

The communication module 190 may establish a wired or wireless communication channel between the electronic device 101 and the external electronic device (e.g., the first external electronic device 102, the second external electronic device 104, or the server 108) and support communication through the established communication channel. The communication module 190 may include at least one communication processor that can operate separately from the processor 120 (e.g., application processor) to support wired or wireless communication. In one embodiment, the communication module 190 may include a wireless communication module 192 (e.g., cellular communication module, short-range wireless communication module, or global navigation satellite system (GNSS) communication module), or a wired communication module 194 (e.g., local area network (LAN) communication module, or power line communication module). The corresponding communication module may communicate with an external electronic device through the first network 198 (e.g., short-range communication network such as Bluetooth, Wi-Fi direct, or infrared data association (IrDA)) or through the second network 199 (e.g., long-distance communication network such as a cellular network, the Internet, or a computer network like a LAN or wide area network (WAN)). The above various communication modules may be implemented as one component (e.g., single chip) or as separate components (e.g., multiple chips). The wireless communication module 192 may identify and authenticate the electronic device 101 in the communication network such as the first network 198 or the second network 199 by using subscriber information stored in the subscriber identification module 196.

The antenna module 197 may transmit or receive a signal or power to or from the outside (e.g., the external electronic devices 102 or 104). In one embodiment, the antenna module 197 may include one antenna having a radiator made of a conductor or conductive pattern formed on a substrate (e.g., PCB). In one embodiment, the antenna module 197 may include a plurality of antennas. In this case, at least one antenna suitable for the communication scheme used in the communication network such as the first network 198 or the second network 199 may be selected from the plurality of antennas by, for example, the communication module 190. The signal or power may be transmitted or received between the communication module 190 and the external electronic devices 102 or 104 through the selected at least one antenna. In one embodiment, in addition to the radiator, another component (e.g., radio frequency integrated circuit (RFIC)) may be further formed as part of the antenna module 197.

At least some of the above components may be connected to each other via a communication scheme between peripherals (e.g., bus, general purpose input and output (GPIO), serial peripheral interface (SPI), or mobile industry processor interface (MIPI)), and may exchange signals (e.g., commands or data) with each other.

In one embodiment, commands or data may be exchanged between the electronic device 101 and the second external electronic device 104 through the server 108 connected to the second network 199. The external electronic devices 102 and 104 may be of the same type as or a different type from the electronic device 101. In one embodiment, all or some of the operations that can be performed by the electronic device 101 may be performed by one or more of the external electronic devices 102, 104 and 108. For example, to perform a certain function or service automatically or upon request, the electronic device 101 may, instead of or in addition to executing the function or service, request one or more external electronic devices to execute at least some of the function or service. Upon reception of the request, the external electronic devices may execute at least a portion of the requested function or service or an additional function or service related to the request, and return the execution results to the electronic device 101. The electronic device 101 may further process the received results if necessary and provide the processing results as a response to the requested function or service. To this end, technologies such as cloud computing, distributed computing, and client-server computing may be used.

The electronic device according to various embodiments disclosed herein can be one of various types of devices, such as portable communication devices (e.g., smartphones), computers, portable multimedia devices, portable medical instruments, cameras, wearable devices, and home appliances. However, the electronic device is not limited to the above-mentioned devices.

It should be understood that the various embodiments of the disclosure and the terminology used herein are not intended to limit the techniques described herein to specific embodiments but to include various modifications, equivalents, and/or alternatives thereof. In the drawings, the same or similar reference symbols are used to refer to the same or like parts. In the description, the singular forms "a", "an" and "the" are intended to include the plural forms as well, unless the context clearly indicates otherwise. In the description, the expression "A or B", "at least one of A and/or B", "A, B or C", or "at least one of A, B and/or C" may indicate all possible combinations of the listed items. The terms "first" and "second" may refer to various elements regardless of importance and/or order and are used to distinguish one element from another element without limitation. It will be understood that when an element (e.g., first element) is referred to as being (functionally or communicatively) "coupled with/to" or "connected with/to" another element (e.g., second element), it can be coupled or connected with/to the other element directly (wiredly), wirelessly, or via a third element.

In the description, the term "module" may refer to a certain unit that is implemented in hardware, software, firmware, or a combination thereof. The term "module" may be used interchangeably with the term "unit", "logic", "logical block", "component", or "circuit", for example. The module may be the minimum unit, or a part thereof, which performs one or more particular functions. For example, a module may be implemented in the form of an application-specific integrated circuit (ASIC).

Various embodiments of the disclosure may be implemented in software (e.g., the programs 140) including instructions stored in a machine-readable storage medium (e.g., internal memory 136 or external memory 138) readable by a machine (e.g., the electronic device 101). For example, the processor (e.g., the processor 120) of the machine (e.g., the electronic device 101) can fetch a stored instruction from a storage medium and execute the fetched instruction. When the instruction is executed by the processor, the machine may perform the function corresponding to the instruction. The instructions may include a code generated by a compiler and a code executable by an interpreter. The machine-readable storage medium may be provided in the form of a non-transitory storage medium. Here, "non-transitory" means that the storage medium does not include a signal and is tangible, but does not distinguish whether data is stored semi-permanently or temporarily in the storage medium.

The method according to various embodiments disclosed herein may be provided as a computer program product. A computer program product may be traded between a seller and a purchaser as a commodity. A computer program product may be distributed in the form of a machine-readable storage medium (e.g., compact disc read only memory (CD-ROM)) or be distributed online (e.g., download or upload) directly between two user devices (e.g. smartphones) through an application store (e.g., Play- Store™). For on-line distribution, at least a portion of the computer program product may be temporarily stored or temporarily created in a storage medium such as a memory of a manufacturer's server, an application store's server, or a relay server.

Each of the components (e.g., modules or programs) according to various embodiments described above may be composed of one or more elements. An existing component may be omitted, and a new component may be added. Alternatively or additionally, some of the components (e.g., modules or programs) may be combined into one entity while maintaining the same functionality. Operations supported by a module, program, or another component may be carried out in sequence, in parallel, by repetition, or heuristically. Some operations may be executed in a different order or may be omitted, and a new operation may be added.

Figure 2A:
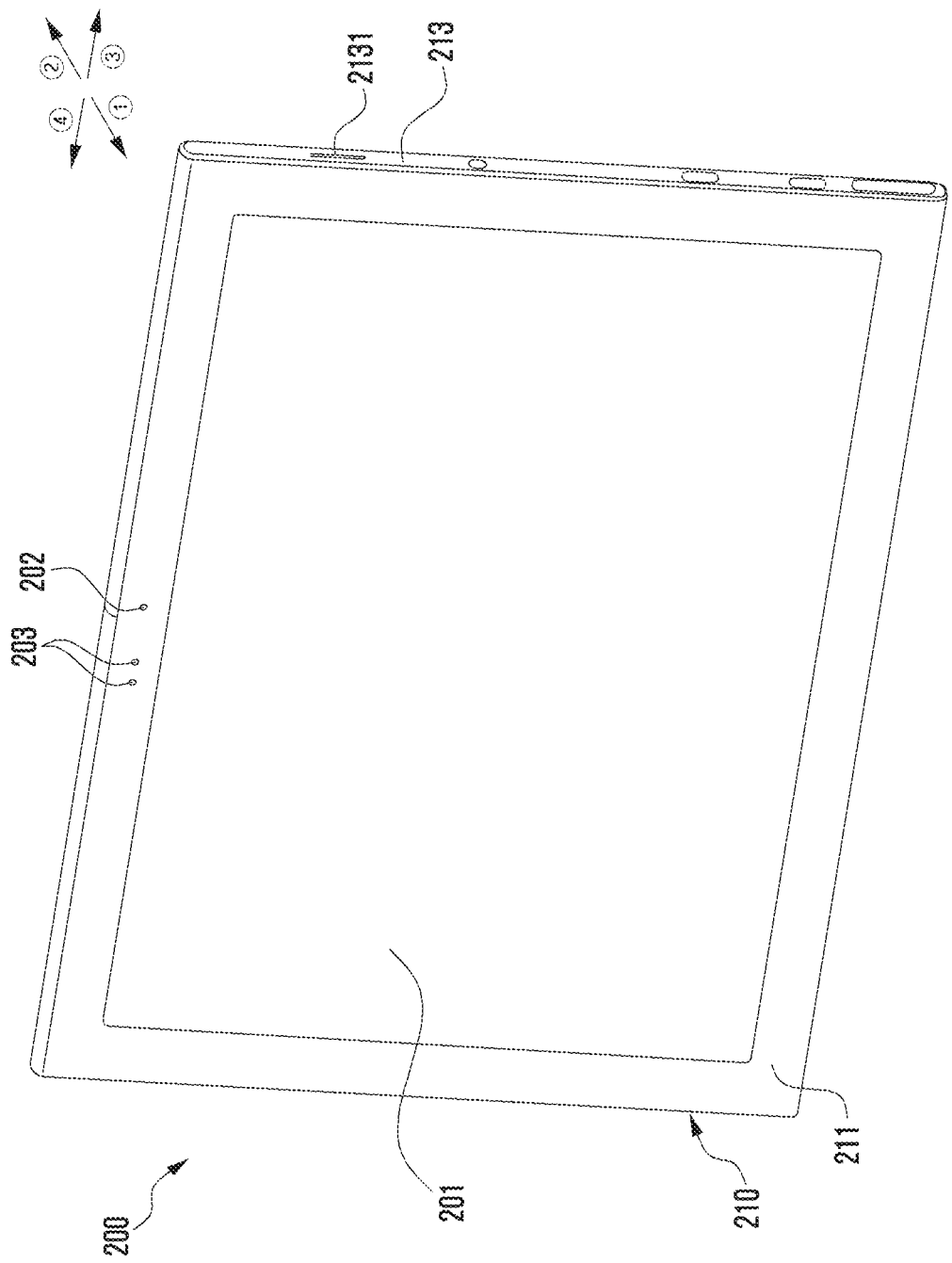
FIGS. 2A and 2B are perspective views showing an electronic device according to various embodiments of the disclosure.
Figure 2B:
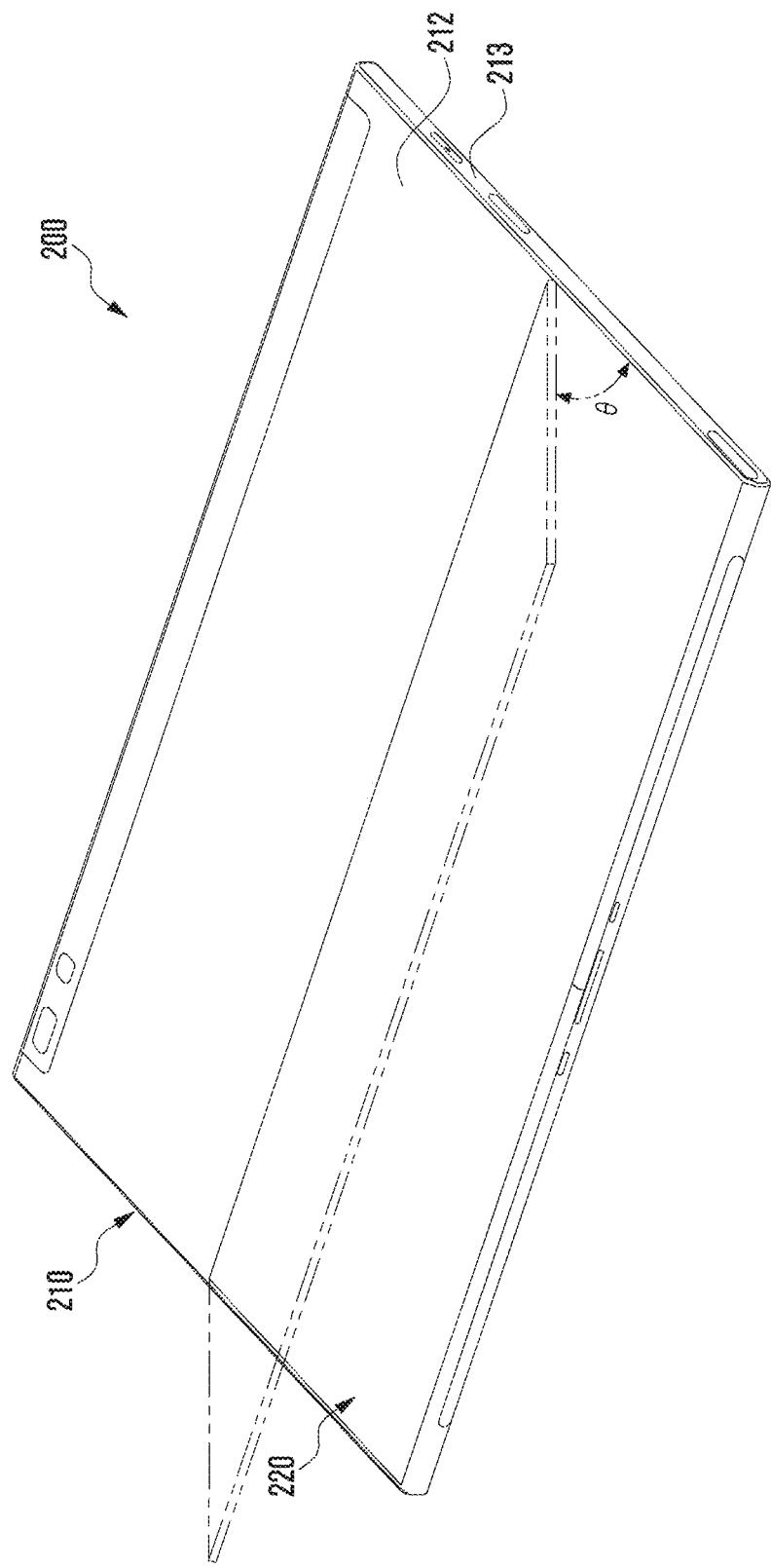

FIGS. 2A and 2B are perspective views showing an electronic device according to various embodiments of the disclosure.

The electronic device 200 shown in FIGS. 2A and 2B may be similar, at least in part, to the electronic device 101 shown in FIG. 1, or may include an electronic device according to other embodiments.

Referring to FIGS. 2A and 2B, the electronic device 200 may include a housing 210 that includes a front plate 211 (also referred to as a first plate) facing in a first direction (indicated by a direction ①), a rear plate 212 (also referred to as a second plate) facing in a second direction (indicated by a direction ②) opposite to the first direction, and a lateral member 213 surrounding a space (e.g., an internal space 2001 in FIG. 4) between the front plate 211 and the rear plate 212. According to an embodiment, the electronic device 200 may include a stand member 220 disposed to be opened or closed at a predetermined angle (e.g., an angle θ in FIG. 2B) from the rear plate 212. According to an embodiment, the rear plate 212 and the lateral member 213 may be formed of separate components or integrally formed with each other. For example, the lateral member 213 may be bent at an angle from and integrally formed with edges of the rear plate 212. According to an embodiment, the front plate 211 may include a substantially transparent glass or polymer plate. According to an embodiment, the rear plate 212 and/or the lateral member 213 may be formed of coated or colored glass, ceramic, polymer, metal (e.g., aluminum, stainless steel (STS), or magnesium), or a combination thereof.

According to various embodiments, the electronic device 200 may include a display 201 disposed in an internal space (e.g., an internal space 2001 in FIG. 4) of the housing 210 to be visible outwardly through at least a portion of the front plate 211. According to an embodiment, the display 201 may include a flexible display. According to an embodiment, the display 201 may include a touch screen display having a touch sensor. According to an embodiment, the display 201 may be disposed to be seen outwardly through the substantially entire area of the front plate 211. According to an embodiment, the electronic device 200 may include at least one camera module 202 and/or at least one sensor module 203, which are disposed on at least a portion of the front plate 211. According to an embodiment, the at least one sensor module 203 may generate an electrical signal or data value corresponding to an internal operating state of the electronic device 200 or to an external environmental condition. The at least one sensor module 203 may include, for example, at least one of an illuminance sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a proximity sensor.

Figure 3:
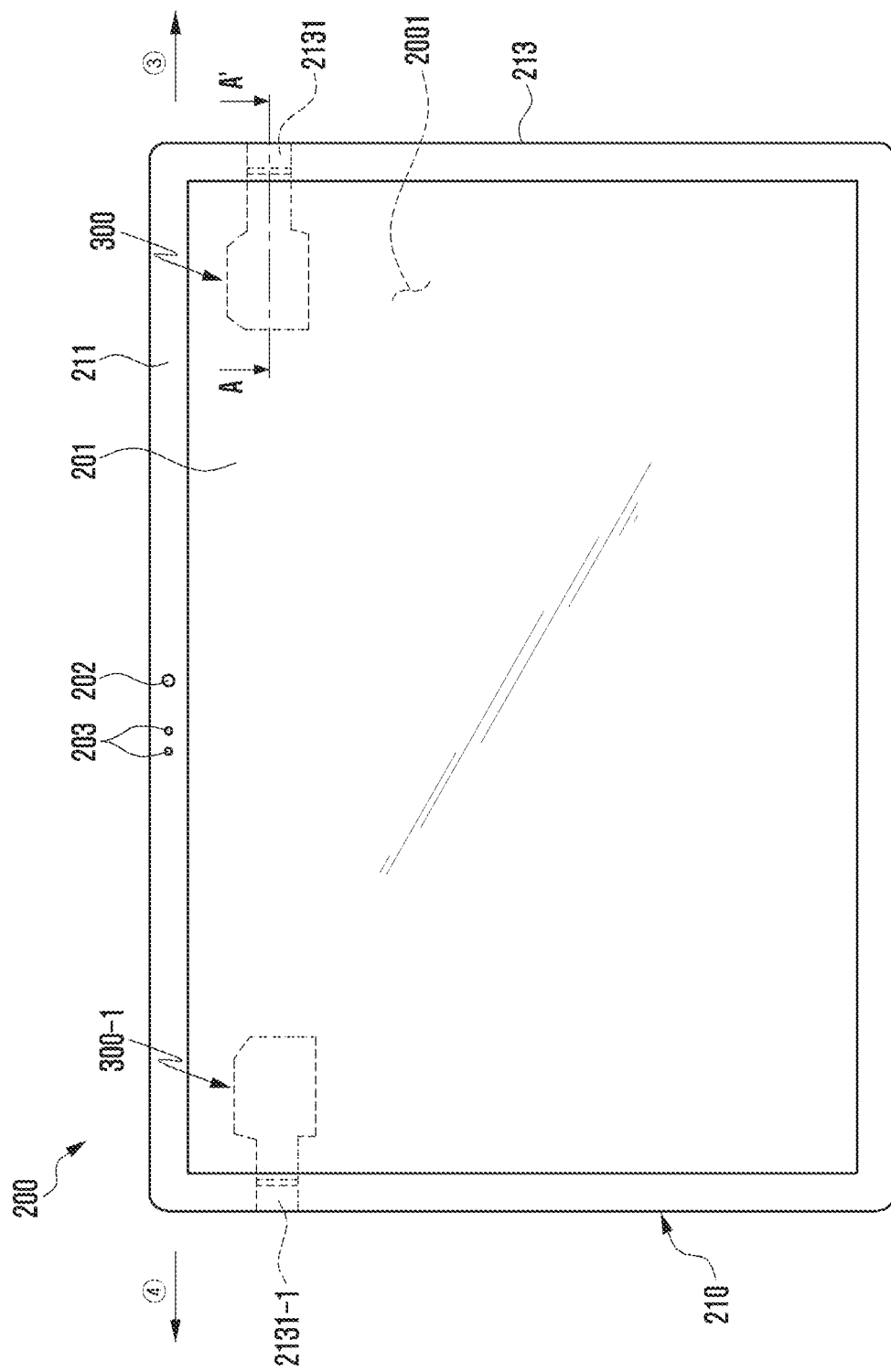
FIG. 3 is a plan view showing an electronic device having a speaker structure disposed therein according to an embodiment of the disclosure.

FIG. 3 is a plan view showing an electronic device having speaker structures disposed therein according to an embodiment of the disclosure.

Referring to FIG. 3, the electronic device 200 may include a pair of speaker structures 300 and 300-1 disposed in an internal space 2001. According to an embodiment, the electronic device 200 may include through-holes 2131 and 2131-1 formed in the lateral member 213 of the housing 210 to be exposed to the outside. According to an embodiment, each of the through-holes 2131 and 2131-1 may be connected to each sound conduit of the speaker structures 300 and 300-1. According to an embodiment, as shown, one through-hole 2131 may be disposed at one side of the housing 210, and the other through-hole 2131-1 may be disposed at the opposing side of the housing 210. In this case, the sound generated from the pair of speaker structures 300 and 300-1 disposed inside the electronic device 200 may be emitted in opposing directions (e.g., indicated by directions ③ and ④) of the lateral member 213 of the housing 210. In another embodiment, only one through-hole and only one corresponding speaker structure adjacent thereto may be disposed, and three or more through-holes and corresponding speaker structures may be disposed. In still another embodiment, at least one of the speaker structures 300 and 300-1 may be disposed to emit sounds in the first direction (e.g., the direction ① in FIG. 2A) of the front plate 211 via the corresponding through-hole(s) formed in the front plate 211.

Figure 4:
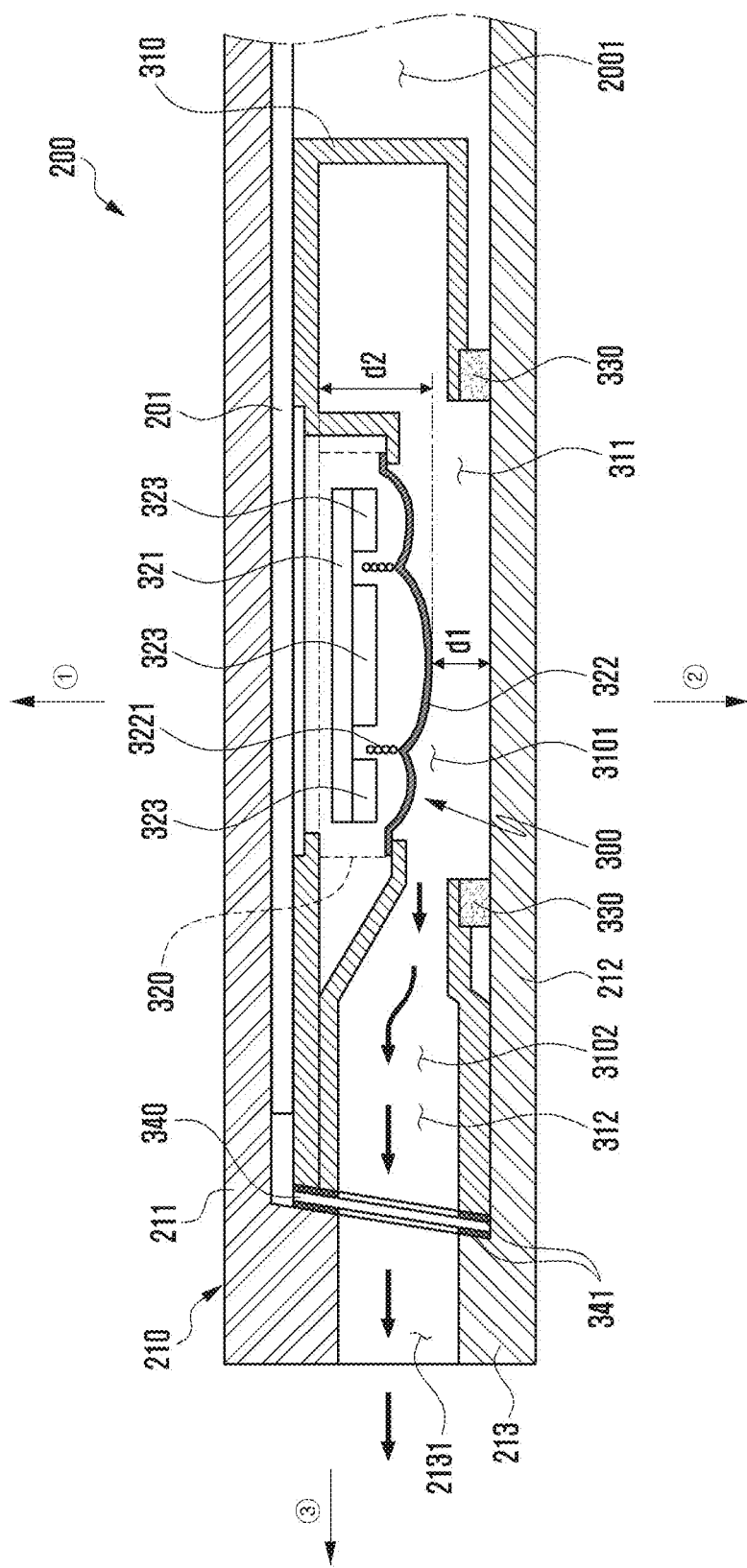
FIG. 4 is a cross-sectional view taken along a line A-A' of FIG. 3 according to an embodiment of the disclosure.

FIG. 4 is a cross-sectional view taken along a line A-A' of FIG. 3 according to an embodiment of the disclosure.

Figure 5:
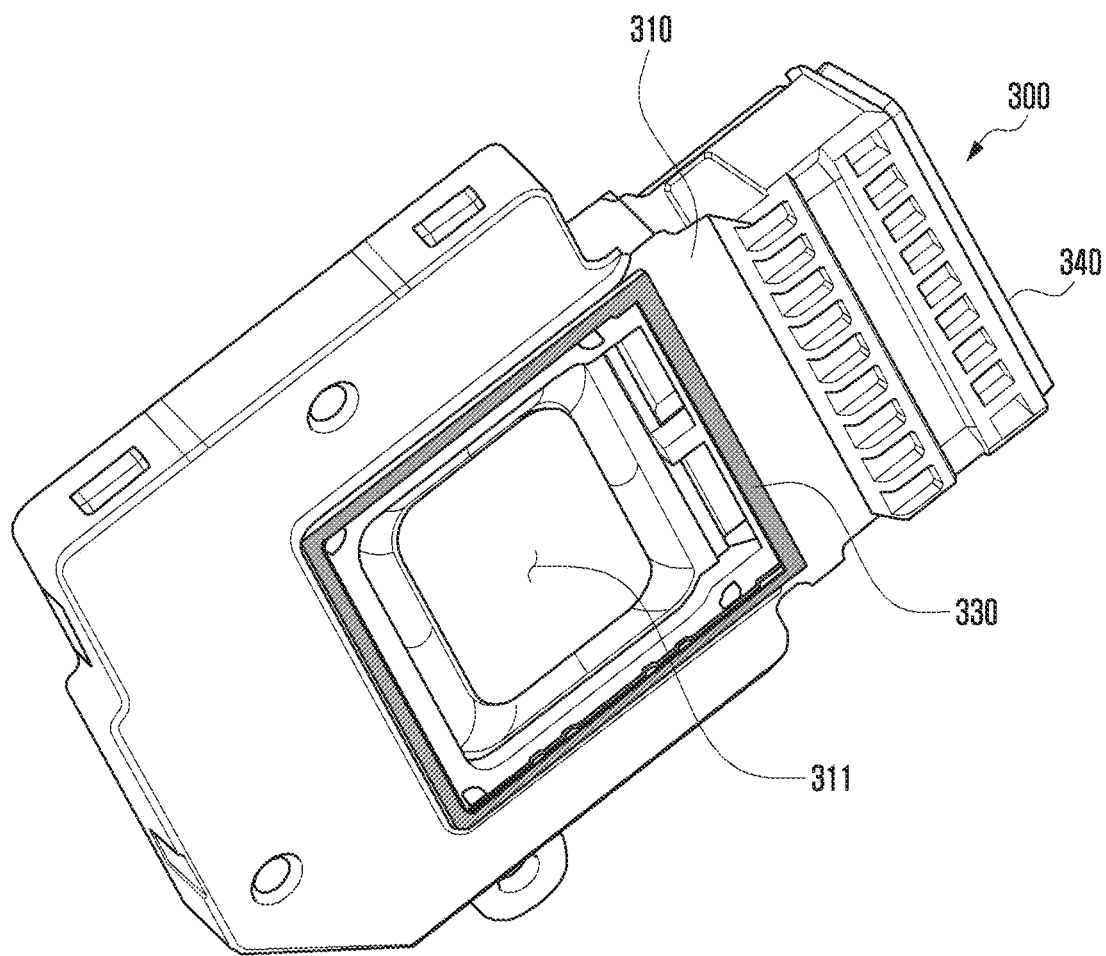
FIG. 5 is a perspective view showing a speaker structure according to an embodiment of the disclosure.

FIG. 5 is a perspective view showing a speaker structure according to an embodiment of the disclosure.

Hereinafter, one speaker structure 300 shown in FIG. 3 will be described with reference to FIGS. 4 and 5. Although not described, the other speaker structure 300-1 shown in FIG. 3 may also have the substantially same configuration and arrangement.

Referring to FIGS. 4 and 5, the electronic device 200 may include the housing 210 and the speaker structure 300 disposed in the internal space 2001 of the housing 210. As described above, the housing 210 includes the front plate 211 facing in the first direction (i.e., the direction ①), the rear plate 212 facing in the second direction (i.e., the direction ②) opposite to the first direction, and the lateral member 213 surrounding the internal space 2001 between the front and rear plates 211 and 212. According to an embodiment, the housing 210 may include at least one through-hole 2131 formed in at least a portion of the lateral member 213 to connect the internal space 2001 and the outside of the electronic device 200. According to an embodiment, the electronic device 200 may include the display 201 disposed in the internal space 2001 to be visible outwardly through at least a portion of the front plate 211.

According to various embodiments, the speaker structure 300 may be disposed near the through-hole 2131 in the internal space 2001 of the electronic device 200. According to an embodiment, the speaker structure 300 may include a speaker housing 310 disposed in the internal space 2001 of the electronic device 200. According to an embodiment, at least a part of the speaker housing 310 may be disposed to face or contact the display 201. In this case, a shielding member (not shown) may be interposed between the speaker housing 310 and the display 201 to shield mutual noise interference.

According to various embodiments, the speaker structure 300 may include at least one yoke 321 that is disposed between the display 201 and the rear plate 212 in an internal space of the speaker housing 310 to face the display 201. According to an embodiment, the at least one yoke 321 may be formed of a metallic material and disposed to surround, at least in part, a magnet 323 to increase the acoustic conductivity of the speaker structure 300. According to an embodiment, the speaker structure 300 may include a diaphragm 322 disposed between the rear plate 212 and the yoke 321 in the internal space of the speaker housing 310 and spaced apart from the rear plate 212. According to an embodiment, the speaker structure 300 may include at least one magnet 323 disposed between the yoke 321 and the diaphragm 322 in the internal space of the speaker housing 310. According to an embodiment, the diaphragm 322 may include a coil member 3221 (e.g., a voice coil) extending toward the magnet 323 and disposed at a position affected by a magnetic force of the at least one magnet 323. According to an embodiment, the diaphragm 322 may be disposed to vibrate in a direction toward the rear plate 212. According to an embodiment, the yoke 321, the diaphragm 322, and the magnet 323 may be disposed directly inside the speaker housing 310 or may be disposed within a separate speaker module housing 320 (e.g., a speaker can).

According to various embodiments, the speaker housing 310 may include a first opening 311 formed toward the rear plate 212. According to an embodiment, the first opening 311 may be disposed at a position overlapped with the diaphragm 322 when the rear plate 212 is viewed from above. According to an embodiment, the speaker housing 310 may include a second opening 312 formed toward the through-hole 2131.

According to various embodiments, the speaker structure 300 may include a sealing member 330 that surrounds the first opening 311 and is interposed between the rear plate 212 and the speaker housing 310. According to an embodiment, the sealing member 330 may be attached to a recess formed as a thin stepped portion at a part of the speaker housing 310 along the rim of the first opening 311. This may prevent the sealing member 330 from being loosened from or moving on the speaker housing 310 during or after an assembly process. According to an embodiment, the sealing member 330 may be formed of rubber, urethane, silicone, poron or any other equivalent material. As such, using the sealing member 330 of a certain compressibility when assembling the speaker structure 300 in the internal space 2001 of the electronic device 200 makes it possible to compensate for any unexpected mechanical deviation.

According to various embodiments, the electronic device 200 may include a first space 3101 formed through the first opening 311, the rear plate 212, and the sealing member 330. According to an embodiment, the electronic device 200 may include a second space 3102 connected to the first space 3101 through the second opening 312. According to an embodiment, the first space 3101 may be used as a space for receiving the vibration of the diaphragm 322. According to an embodiment, the second space 3102 may be used as a sound conduit or acoustic guide for transmitting the sound from the first space 3101 to the through-hole 2131 of the housing 210. Accordingly, the sound generated through the vibration of the diaphragm 322 may be emitted to the outside of the electronic device 200 through the first space 3101, the second space 3102, and the through-hole 2131.

According to various embodiments, the speaker structure 300 may include a separating member 340 disposed to spatially separate the through-hole 2131 of the housing 210 and the second space 3102 of the speaker housing 310. According to an embodiment, the separating member 340 may be formed of a mesh attached between the through-hole 2131 and the second opening 312 by means of a fixing or adhesive member 341. According to an embodiment, the adhesive member 341 may include a double-sided tape and/or a sealing rubber. According to an embodiment, the sealing rubber has an elastic property and is compressively interposed between the housing 210 and the speaker housing 310, thus preventing moisture entered via the through-hole 2131 from further flowing into the internal space 2001 of the electronic device 200 beyond the speaker housing 310. According to an embodiment, the mesh may be attached using at least one of double sided tape, rubber, urethane or silicone. According to an embodiment, the mesh may block the inflow of external moisture and also allow the sound produced by the speaker structure 300 to be emitted to the outside through the through-hole 2131.

According to various embodiments, because of the first opening 311, the speaker structure 300 sealed by both the rear plate 212 and the sealing member 330 may have an expanded first distance (d1) between the diaphragm 322 and the rear plate 212 without changing the overall thickness of the electronic device 200. According to an embodiment, the speaker structure 300 may smoothly receive the vibration width of the diaphragm 322 by the first distance (d1) expanded to include the first opening 311, thereby having an improved sound quality (e.g., in a low frequency band). In another embodiment where the first opening 311 is removed from the speaker housing 310, the first distance (d1) between the diaphragm 322 and the rear plate 212 may be reduced to the minimum distance allowing the smooth vibration of the diaphragm 322, and a second distance (d2) of the speaker module including the yoke 321, the diaphragm 322, and/or the magnet 323 may be reduced accordingly. This is also helpful to slimming down the electronic device 200.

Figure 6:
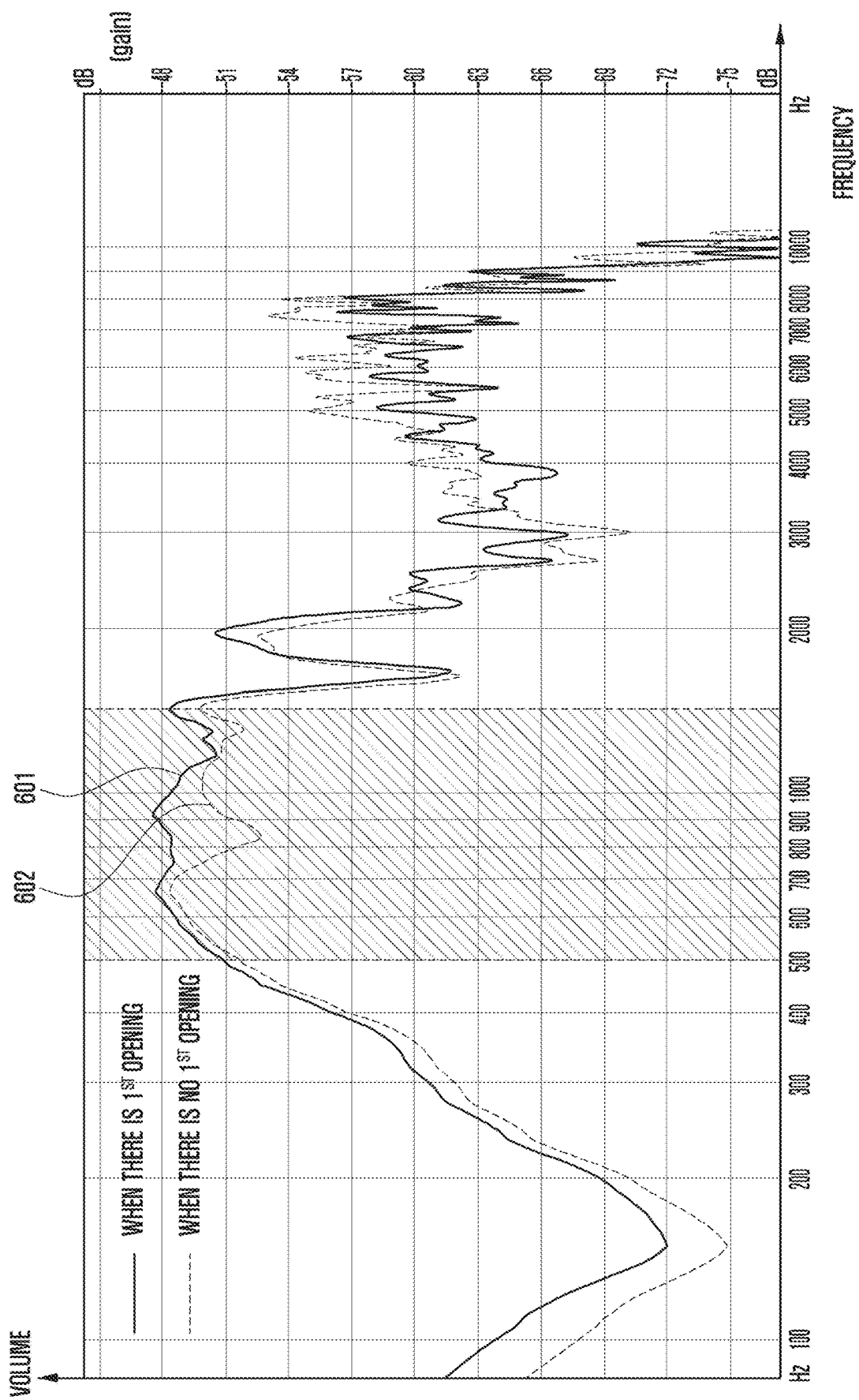
FIG. 6 is a graph showing a comparison of acoustic characteristics depending on a presence or absence of a first opening according to an embodiment of the disclosure.

FIG. 6 is a graph showing a comparison of acoustic characteristics depending on the presence or absence of a first opening according to an embodiment of the disclosure.

Referring to FIG. 6, in a hatched, in a low frequency band (e.g., from about 500 Hz to about 1500 Hz) affected relatively greater by the vibration width of the diaphragm (e.g., the diaphragm 322 in FIG. 4), the speaker structure (e.g., the speaker structure 300 in FIG. 4) according to various embodiments has a relatively improved gain when there is the first opening (e.g., the first opening 311 in FIG. 4) (see graph 601) than when there is no first opening (see graph 602).

Figure 7:
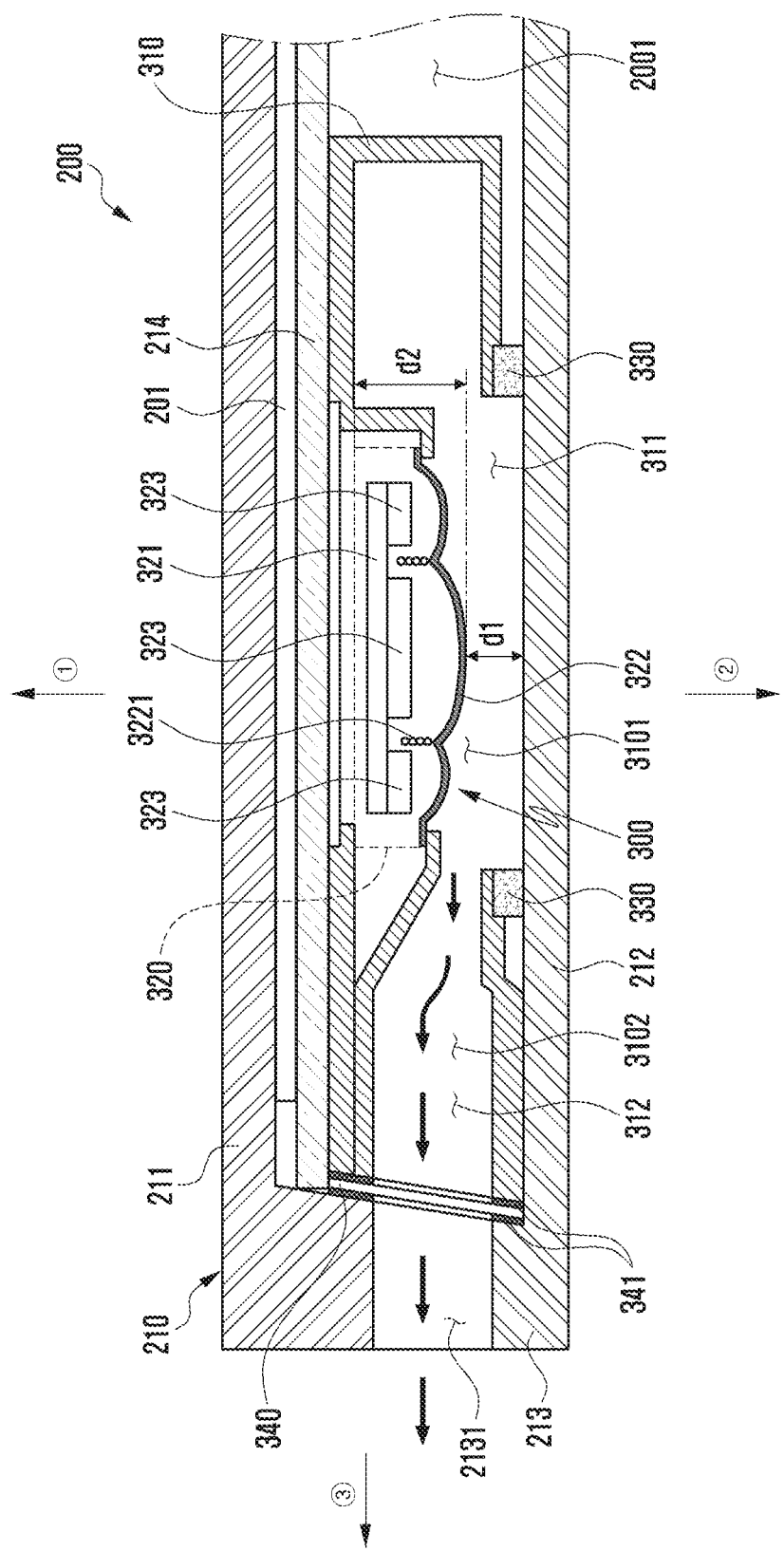
FIG. 7 is a cross-sectional view showing an electronic device including a speaker structure according to an embodiment of the disclosure.

FIG. 7 is a cross-sectional view showing an electronic device including a speaker structure according to an embodiment of the disclosure.

The electronic device 200 and the speaker structure 300 thereof shown in FIG. 7 have the substantially same or similar configurations as those of FIG. 4, so that a detailed description thereof will be omitted.

Referring to FIG. 7, the electronic device 200 may include an intermediate plate 214 disposed in the internal space 2001 thereof. According to an embodiment, the intermediate plate 214 disposed in the internal space 2001 may be helpful to reinforcing the stiffness of the electronic device 200 and also effectively mounting electronic components (e.g., a printed circuit board or a battery). According to an embodiment, the intermediate plate 214 may be formed of a metallic material, a polymer, or a heterogeneous material that is produced by the metallic material and the polymer via, e.g., insert injection molding. According to an embodiment, the intermediate plate 214 may be interposed between the display 201 and the speaker housing 310. Thus, the speaker housing 310 may be disposed to at least partially face the intermediate plate 214.

Figure 8:
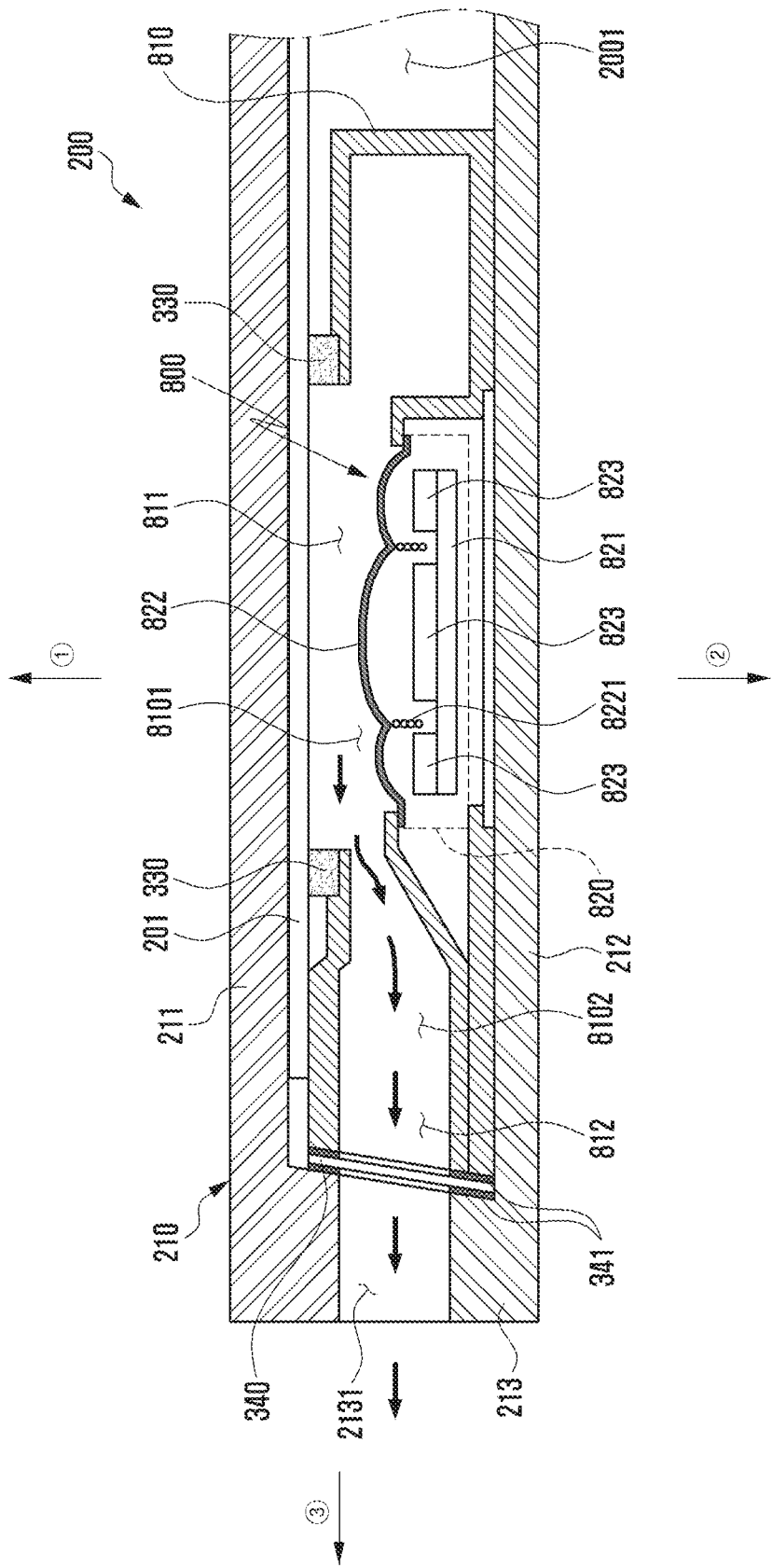
FIGS. 8 and 9 are cross-sectional views showing an electronic device including a speaker structure according to various embodiments of the disclosure.
Figure 9:
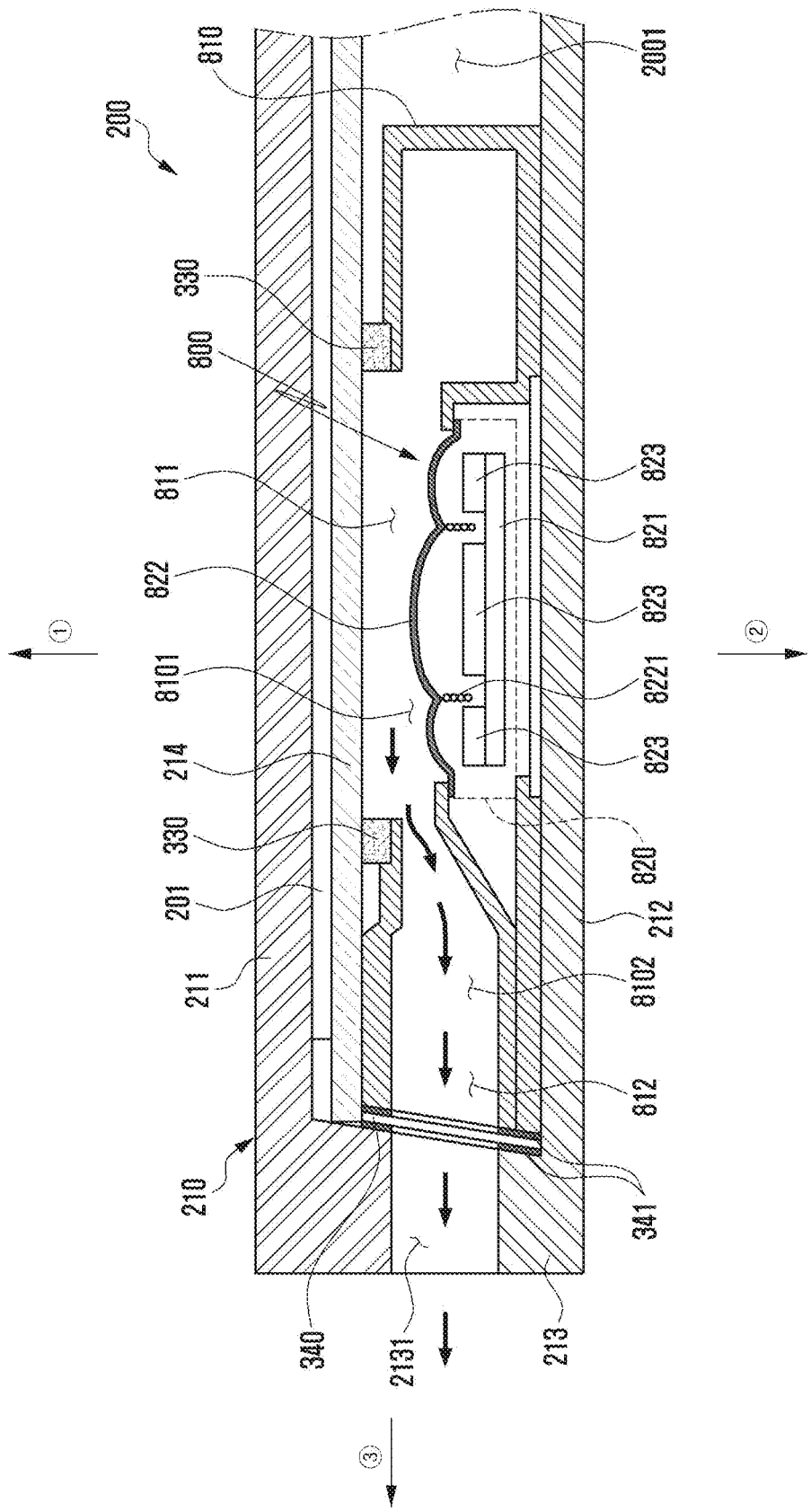

FIGS. 8 and 9 are cross-sectional views showing an electronic device including a speaker structure according to various embodiments of the disclosure.

In the following description about FIGS. 8 and 9, the same reference numerals will be used for the same configurations as those described above, and a detailed description thereof may be omitted.

Referring to FIG. 8, the electronic device 200 may include the housing 210 and the speaker structure 800 disposed in the internal space 2001 of the housing 210. As described above, the housing 210 includes the front plate 211, the rear plate 212, and the lateral member 213 surrounding the internal space 2001 between the front and rear plates 211 and 212. According to an embodiment, the housing 210 may include at least one through-hole 2131 formed in at least a portion of the lateral member 213 to connect the internal space 2001 and the outside of the electronic device 200. According to an embodiment, the electronic device 200 may include the display 201 disposed in the internal space 2001 to be visible outwardly through at least a portion of the front plate 211.

According to various embodiments, the speaker structure 800 may be disposed near the through-hole 2131 in the internal space 2001 of the electronic device 200. According to an embodiment, the speaker structure 800 may include a speaker housing 810 disposed in the internal space 2001 of the electronic device 200. According to an embodiment, at least a part of the speaker housing 810 may be disposed to face or contact the rear plate 212.

According to various embodiments, the speaker structure 800 may include at least one yoke 821 that is disposed between the display 201 and the rear plate 212 in an internal space of the speaker housing 810 to face the rear plate 212. According to an embodiment, the at least one yoke 821 may be formed of a metallic material and disposed to surround, at least in part, a magnet 823 to increase the acoustic conductivity of the speaker structure 800. According to an embodiment, the speaker structure 800 may include a diaphragm 822 disposed between the display 201 and the yoke 821 in the internal space of the speaker housing 810 and spaced apart from the display 201. According to an embodiment, the speaker structure 800 may include at least one magnet 823 disposed between the yoke 821 and the diaphragm 822 in the internal space of the speaker housing 810. According to an embodiment, the diaphragm 822 may include a coil member 8221 (e.g., a voice coil) extending toward the magnet 823 and disposed at a position affected by a magnetic force of the at least one magnet 823. According to an embodiment, the diaphragm 822 may be disposed to vibrate in a direction toward the display 201. According to an embodiment, the yoke 821, the diaphragm 822, and the magnet 823 may be disposed directly inside the speaker housing 810 or may be disposed within a separate speaker module housing 820 (e.g., a speaker can).

According to various embodiments, the speaker housing 810 may include a first opening 811 formed toward the display 201. According to an embodiment, the first opening 811 may be disposed at a position overlapped with the diaphragm 822 when the front plate 211 is viewed from above. According to an embodiment, the speaker housing 810 may include a second opening 812 formed toward the through-hole 2131.

According to various embodiments, the speaker structure 800 may include the sealing member 330 that surrounds the first opening 811 and is interposed between the display 201 and the speaker housing 810. According to an embodiment, the sealing member 330 may be attached to a recess formed as a thin stepped portion at a part of the speaker housing 810 along the rim of the first opening 811. This may prevent the sealing member 330 from being loosened from or moving on the speaker housing 810 during or after an assembly process. According to an embodiment, the sealing member 330 may be formed of rubber, urethane, silicone, or any other equivalent material.

According to various embodiments, the electronic device 200 may include a first space 8101 formed through the first opening 811, the display 201, and the sealing member 330. According to an embodiment, the electronic device 200 may include a second space 8102 connected to the first space 8101 through the second opening 812. According to an embodiment, the first space 8101 may be used as a space for receiving the vibration of the diaphragm 822. According to an embodiment, the second space 8102 may be used as a sound conduit or acoustic guide for transmitting the sound from the first space 8101 to the through-hole 2131 of the housing 210. Accordingly, the sound generated through the vibration of the diaphragm 822 may be emitted to the outside of the electronic device 200 through the first space 8101, the second space 8102, and the through-hole 2131.

According to various embodiments, because of the first opening 811, the speaker structure 800 sealed by both the display 201 and the sealing member 330 may have an improved sound quality and be also helpful to slimming down the electronic device 200 without changing the overall thickness of the electronic device 200.

Meanwhile, the electronic device 200 and the speaker structure 800 thereof shown in FIG. 9 have the substantially same or similar configurations as those of FIG. 8, so that a detailed description thereof will be omitted.

Referring to FIG. 9, the electronic device 200 may include the intermediate plate 214 disposed in the internal space 2001 thereof. According to an embodiment, the intermediate plate 214 disposed in the internal space 2001 may be helpful to reinforcing the stiffness of the electronic device 200 and also effectively mounting electronic components (e.g., a printed circuit board or a battery). According to an embodiment, the intermediate plate 214 may be interposed between the display 201 and the speaker housing 810. Thus, the first opening 811 of the speaker housing 810 may be disposed to at least partially face the intermediate plate 214, and the sealing member 330 may be interposed between the rim of the first opening 811 and the intermediate plate 214.

Figure 10:
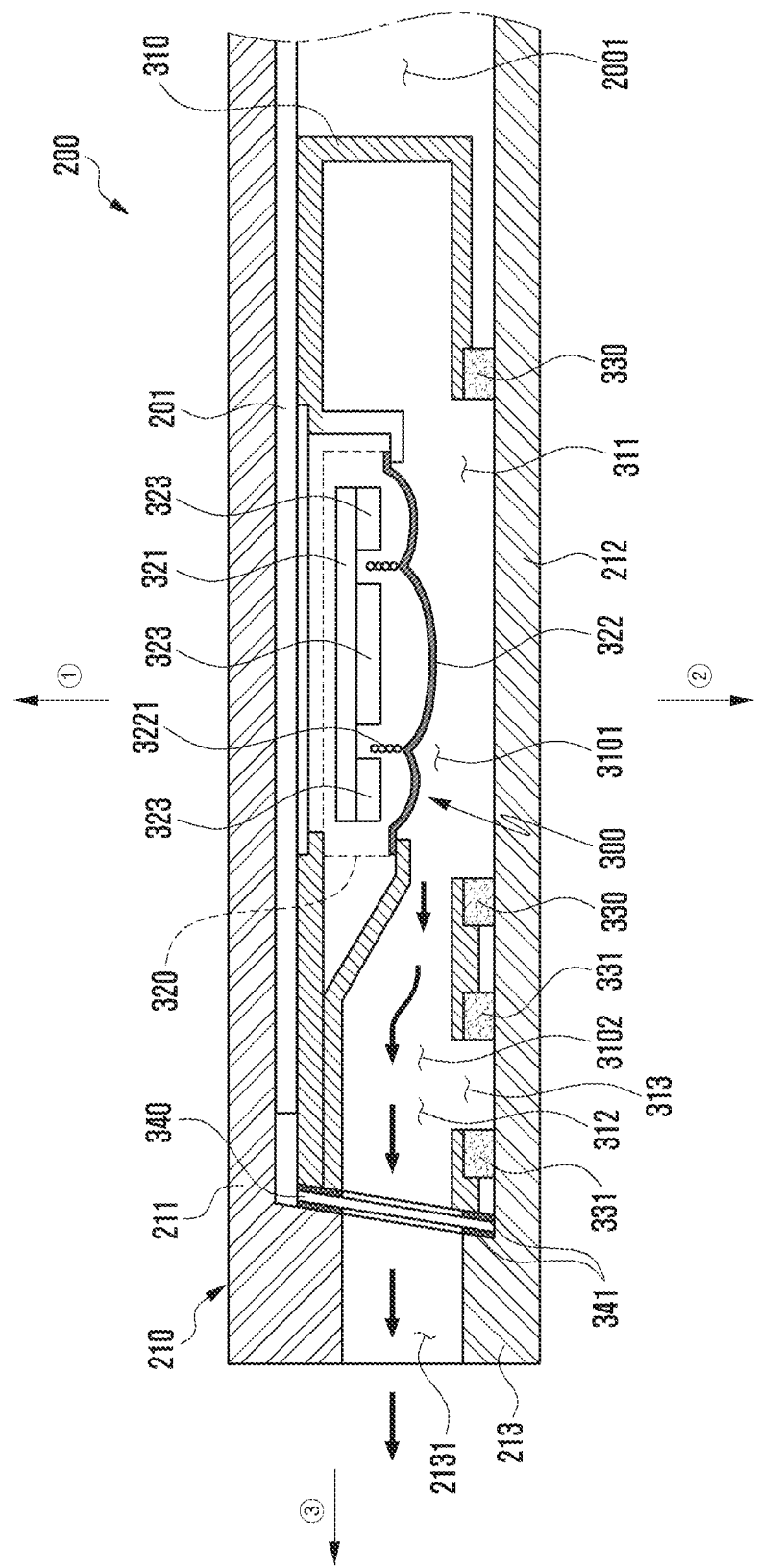
FIG. 10 is a cross-sectional view showing an electronic device including a speaker structure according to an embodiment of the disclosure.

FIG. 10 is a cross-sectional view showing an electronic device including a speaker structure according to an embodiment of the disclosure.

Figure 11:
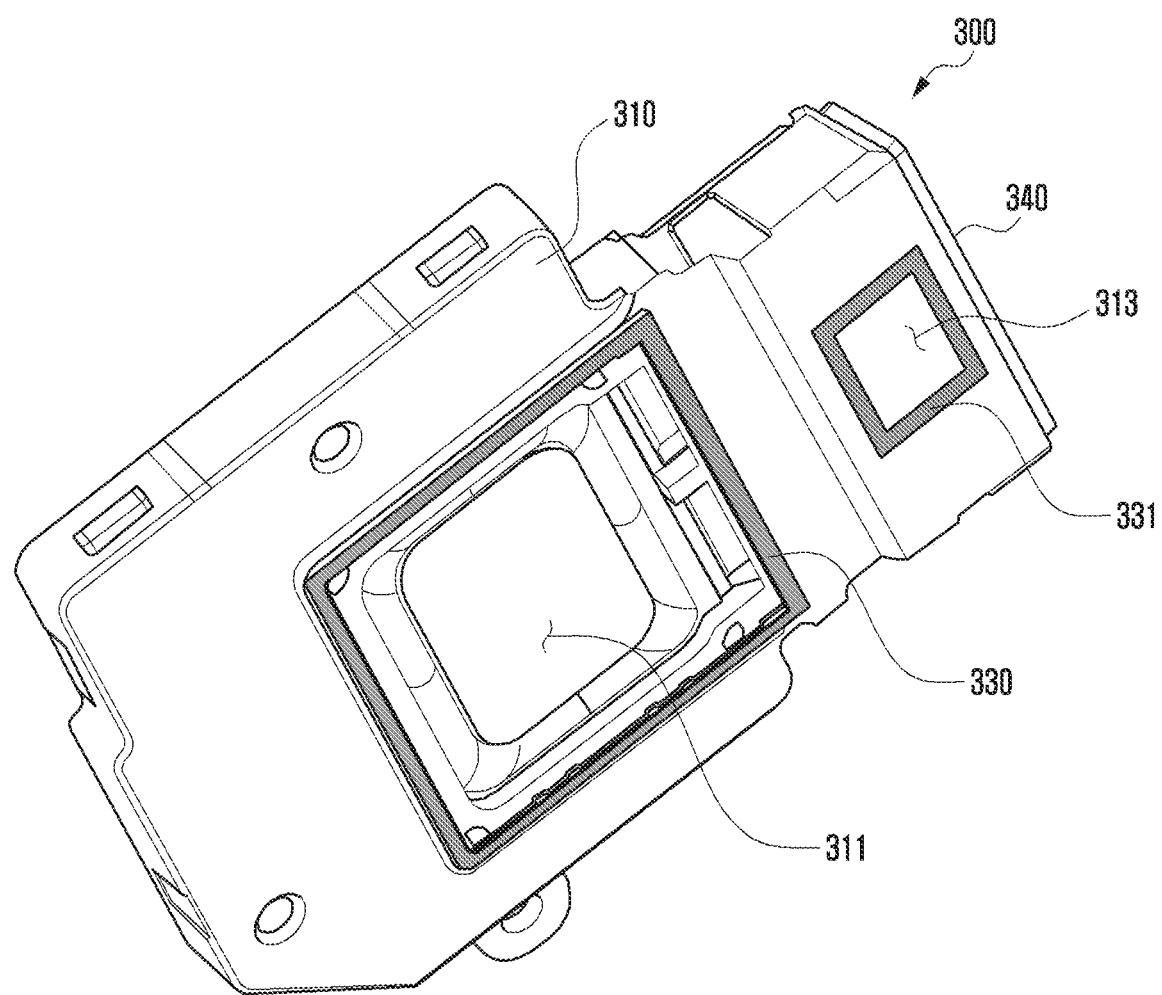
FIG. 11 is a perspective view showing a speaker structure applied to an example shown in FIG. 10 according to an embodiment of the disclosure.

FIG. 11 is a perspective view showing a speaker structure applied to an example shown in FIG. 10 according to an embodiment of the disclosure.

The electronic device 200 and the speaker structure 300 thereof shown in FIG. 10 have the substantially same or similar configurations as those of FIG. 4, so that a detailed description thereof will be omitted.

Referring to FIGS. 10 and 11, the speaker housing 310 may include a third opening 313 formed toward the rear plate 212 of the housing 210 around the second opening 312 formed as a sound conduit. According to an embodiment, the speaker structure 300 may include another sealing member 331 disposed between the speaker housing 310 and the rear plate 212 along the rim of the third opening 313. This sealing member 331 may be formed of the substantially same material as the above-described sealing member 330, and may also be attached to a recess formed at a part of the speaker housing 310 along the rim of the third opening 313.

According to various embodiments, further using the third opening 313 and the corresponding sealing member 331 may improve the sound quality of the speaker structure 300 via a change in the sound conduit and also be helpful to structural coupling of the speaker housing 310 and surrounding structures (e.g., the rear plate 212). In another embodiment, the speaker housing 310 may be designed to have only the third opening 313 instead of the first opening 311. In still another embodiment, the third opening 313 may be formed toward the display 201 or the intermediate plate (e.g., the intermediate plate 214 in FIG. 7) in the speaker housing 310. In yet another embodiment, two or more third openings 313 may be formed at regular intervals in the speaker housing 310.

As described hereinbefore, in the electronic device according to various embodiments of the disclosure, a partial region of the speaker housing overlapping the diaphragm is removed, and a sealing structure is correspondingly provided around the removed region. Therefore, a vibration space of the diaphragm is assured as much as the thickness of the removed region, and a high quality sound is obtained. In addition, because of the removed region of the speaker housing, it is possible to reduce the thickness of the speaker structure while maintaining the minimum distance from the diaphragm to surrounding structures of the electronic device. This is advantageous to realize a slimmer electronic device.

According to various embodiments, an electronic device (e.g., the electronic device 200 in FIG. 4) may include a housing (e.g., the housing 210 in FIG. 4) including a front plate (e.g., the front plate 211 in FIG. 4) facing in a first direction, a rear plate (e.g., the rear plate 212 in FIG. 4) facing in a second direction opposite to the first direction, and a lateral member (e.g., the lateral member 213 in FIG. 4) surrounding a space (e.g., the internal space 2001 in FIG. 4) between the front and rear plates and having at least one through-hole (e.g., the through-hole 2131 in FIG. 4); a display (e.g., the display 201 in FIG. 4) disposed to be seen through the front plate; and a speaker structure (e.g., the speaker structure 300 in FIG. 4) disposed near the through-hole in the space between the display and the rear plate. The speaker structure may include a yoke (e.g., the yoke 321 in FIG. 4) disposed between the display and the rear plate and facing the display; a diaphragm (e.g., the diaphragm 322 in FIG. 4) disposed between the rear plate and the yoke and spaced apart from the rear plate; a magnet (e.g., the magnet 323 in FIG. 4) disposed between the yoke and the diaphragm; a speaker housing (e.g., the speaker housing 310 in FIG. 4) surrounding, at least in part, at least one of the diaphragm, the yoke, or the magnet and including a first opening (e.g., the first opening 311 in FIG. 4) formed toward the rear plate and a second opening (e.g., the second opening 312 in FIG. 4) formed toward the through-hole; and a sealing member (e.g., the sealing member 330 in FIG. 4) disposed between the speaker housing and the rear plate and surrounding the first opening when viewed from the rear plate. A sound conduit may include, between the diaphragm and the through-hole, a first space (e.g., the first space 3101 in FIG. 4) formed by the first opening, the rear plate, and the sealing member, and a second space (e.g., the second space 3102 in FIG. 4) connected to the first space through the second opening.

According to various embodiments, the first opening may be in sound communication with the first opening and the diaphragm.

According to various embodiments, the sealing member may be formed of rubber, urethane, or silicone.

According to various embodiments, at least a portion of the display may be disposed between the speaker housing and the front plate.

According to various embodiments, the electronic device may further include an intermediate plate (e.g., the intermediate plate 214 in FIG. 7) disposed between the display and the speaker housing.

According to various embodiments, the sealing member may be attached to a recess formed as a thin stepped portion at a part of the speaker housing along a rim of the first opening.

According to various embodiments, the first opening may be disposed at a position overlapped with the diaphragm when the rear plate is viewed from above.

According to various embodiments, the speaker structure may further include a separating member (e.g., the separating member 340 in FIG. 4) disposed to spatially separate the through-hole of the housing and the second space of the speaker housing.

According to various embodiments, a distance (e.g., the first distance (d1) in FIG. 4) between the diaphragm and the rear plate through the first opening may be determined by a maximum vibration width of the diaphragm.

According to various embodiments, the speaker structure may further include a third opening (e.g., the third opening 313 in FIG. 10) formed toward the rear plate around the second opening of the speaker housing, and another sealing member (e.g., another sealing member 331 in FIG. 10) disposed between the speaker housing and the rear plate along a rim of the third opening.

According to various embodiments, an electronic device (e.g., the electronic device 200 in FIG. 9) may include a housing (e.g., the housing 210 in FIG. 9) including a front plate (e.g., the front plate 211 in FIG. 9) facing in a first direction, a rear plate (e.g., the rear plate 212 in FIG. 9) facing in a second direction opposite to the first direction, and a lateral member (e.g., the lateral member 213 in FIG. 9) surrounding a space (e.g., the internal space 2001 in FIG. 9) between the front and rear plates and having at least one through-hole (e.g., the through-hole 2131 in FIG. 9); a display (the display 201 in FIG. 9) disposed to be seen through the front plate; an intermediate plate (e.g., the intermediate plate 214 in FIG. 9) disposed between the display and the rear plate; and a speaker structure (e.g., the speaker structure 800 in FIG. 9) disposed near the through-hole in the space between the intermediate plate and the rear plate. The speaker structure may include a yoke (e.g., the yoke 821 in FIG. 9) disposed between the intermediate plate and the rear plate and facing the rear plate; a diaphragm (e.g., the diaphragm 822 in FIG. 9) disposed between the intermediate plate and the yoke and spaced apart from the intermediate plate; a magnet (e.g., the magnet 823 in FIG. 9) disposed between the yoke and the diaphragm; a speaker housing (e.g., the speaker housing 810 in FIG. 9) surrounding, at least in part, at least one of the diaphragm, the yoke, or the magnet and including a first opening (e.g., the first opening 811 in FIG. 9) formed toward the intermediate plate and a second opening (e.g., the second opening 812 in FIG. 9) formed toward the through-hole; and a sealing member (e.g., the sealing member 330 in FIG. 9) disposed between the speaker housing and the intermediate plate and surrounding the first opening when viewed from the intermediate plate. A sound conduit may include, between the diaphragm and the through-hole, a first space (e.g., the first space 8101 in FIG. 9) formed by the first opening, the intermediate plate, and the sealing member, and a second space (e.g., the second space 8102 in FIG. 9) connected to the first space through the second opening.

According to various embodiments, the first opening may be in sound communication with the first opening and the diaphragm.

According to various embodiments, the sealing member may be formed of rubber, urethane, or silicone.

According to various embodiments, the sealing member may be attached to a recess formed as a thin stepped portion at a part of the speaker housing along a rim of the first opening.

According to various embodiments, the first opening may be disposed at a position overlapped with the diaphragm when the front plate is viewed from above.

According to various embodiments, a distance between the diaphragm and the intermediate plate through the first opening may be determined by a maximum vibration width of the diaphragm.

According to various embodiments, an electronic device (e.g., the electronic device 200 in FIG. 8) may include a housing (e.g., the housing 210 in FIG. 8) including a front plate (e.g., the front plate 211 in FIG. 8) facing in a first direction, a rear plate (e.g., the rear plate 212 in FIG. 8) facing in a second direction opposite to the first direction, and a lateral member (e.g., the lateral member 213 in FIG. 8) surrounding a space (e.g., the internal space 2001 in FIG. 8) between the front and rear plates and having at least one through-hole (e.g., the through-hole 2131 in FIG. 8); at least one structure (e.g., the display 201 in FIG. 8 and/or the intermediate plate 214 in FIG. 9) disposed between the front plate and the rear plate; an acoustic module (e.g., the speaker structure 800 in FIG. 8) disposed near the through-hole in the space between the structure and the rear plate; and a sealing member (e.g., the sealing member 330 in FIG. 8). The acoustic module may include an acoustic module housing (e.g., the speaker housing 810 in FIG. 8) disposed in the space and including a first opening (e.g., the first opening 811 in FIG. 8) formed toward the structure and a second opening (e.g., the second opening 812 in FIG. 8) formed toward the through-hole in communication with the first opening; a diaphragm (e.g., the diaphragm 822 in FIG. 8) disposed to be exposed, at least in part, toward the structure through the first opening in the acoustic module housing; at least one magnet (e.g., the magnet 823 in FIG. 8) disposed near the diaphragm; and at least one yoke (e.g., the yoke 821 in FIG. 8) disposed to be at least partially in contact with the at least one magnet. The sealing member may be disposed between the acoustic module housing and the structure along a rim of the first opening. A sound conduit may include a first space (e.g., the first space 8101 in FIG. 8) formed by the first opening, the structure, and the sealing member, and a second space (e.g., the second space 8102 in FIG. 8) connected to the first space through the second opening.

According to various embodiments, the acoustic module may include a speaker (e.g., the audio module 170 in FIG. 1) or a microphone (e.g., the audio module 170 in FIG. 1).

According to various embodiments, the structure may include a display (e.g., the display 201 in FIG. 8) disposed to be visible outwardly through at least a portion of the front plate and/or an intermediate plate (e.g., the intermediate plate 214 in FIG. 9) disposed to reinforce stiffness of the electronic device.

According to various embodiments, a distance between the diaphragm and the structure through the first opening may be determined by a maximum vibration width of the diaphragm.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing comprising:
a front plate facing a first direction,
a rear plate facing a second direction opposite to the first direction, and
a lateral member surrounding a space between the front plate and the rear plate, the lateral member having at least one through-hole;
a display disposed to be viewed through the front plate;
an intermediate plate disposed between the display and the rear plate; and
a speaker structure disposed adjacent to the at least one through-hole in the space,
wherein the speaker structure comprises:
a yoke disposed between the intermediate plate and the rear plate, the yoke facing the rear plate,
a diaphragm disposed between the intermediate plate and the yoke, the diaphragm being spaced apart from the intermediate plate,
a magnet disposed between the yoke and the diaphragm,
a speaker housing surrounding, at least in part, at least one of the diaphragm, the yoke, or the magnet, the speaker housing including a first opening formed toward the intermediate plate, a recess formed as a thin stepped portion at a part of the speaker housing, and a second opening formed toward the at least one through-hole, and
a sealing member disposed in the recess between the speaker housing and the intermediate plate, the sealing member surrounding the first opening when viewed from the intermediate plate, and
wherein a sound conduit includes, between the diaphragm and the at least one through-hole, a first space formed by the first opening, the intermediate plate along a rim of the first opening, and the sealing member, and a second space connected to the first space through the second opening.

2. The electronic device of claim 1, wherein the first opening is in sound communication with the second opening and the diaphragm.

3. The electronic device of claim 1, wherein the sealing member is formed of at least one of rubber, urethane, or silicone.

4. The electronic device of claim 1, wherein the sealing member is attached to the recess.

5. The electronic device of claim 1, wherein the first opening is disposed at a position overlapped with the diaphragm when the front plate is viewed from above.

6. The electronic device of claim 1, wherein a distance between the diaphragm and the intermediate plate through the first opening is determined by a maximum vibration width of the diaphragm.

7. An electronic device comprising:
a housing comprising:
a front plate facing a first direction,
a rear plate facing a second direction opposite to the first direction, and a lateral member surrounding a space between the front plate and the rear plate, the lateral member having at least one through-hole;

a display disposed to be viewed through the front plate;

an intermediate plate disposed between the display and the rear plate;

a structure disposed between the front plate and the rear plate;

an acoustic device disposed adjacent to the at least one through-hole in the space, the acoustic device comprising:

an acoustic device housing disposed in the space and including a first opening and a second opening, the first opening being formed toward the intermediate plate, a recess formed as a thin stepped portion at a part of the acoustic device housing, and the second opening being formed toward the at least one through-hole, the second opening being in sound communication with the first opening, a diaphragm disposed to be exposed, at least in part, toward the structure through the first opening in the acoustic device housing, at least one magnet disposed adjacent to the diaphragm, and at least one yoke disposed to be at least partially in contact with the at least one magnet; and a sealing member disposed in the recess between the acoustic device housing and the intermediate plates along a rim of the first opening, wherein a sound conduit comprises:

a first space formed by the first opening, the structure, and the sealing member, and a second space connected to the first space through the second opening.

8. The electronic device of claim 7, wherein the acoustic device comprises at least one of a speaker or a microphone.

9. The electronic device of claim 7, wherein a distance between the diaphragm and the structure through the first opening is determined by a maximum vibration width of the diaphragm.

* * * * *